US012071047B2

(12) United States Patent
Feng

(10) Patent No.: US 12,071,047 B2
(45) Date of Patent: Aug. 27, 2024

(54) ELECTRIC ROTATION DEVICE FOR AUTOMOBILE SEAT

(71) Applicant: YANFENG INTERNATIONAL SEATING SYSTEMS CO., LTD., Shanghai (CN)

(72) Inventor: Qingwei Feng, Shanghai (CN)

(73) Assignee: YANFENG INTERNATIONAL SEATING SYSTEMS CO., LTD., Shanghai (CN)

( * ) Notice: Subject to any disclaimer, the term of this patent is extended or adjusted under 35 U.S.C. 154(b) by 432 days.

(21) Appl. No.: 17/310,627

(22) PCT Filed: Dec. 31, 2019

(86) PCT No.: PCT/CN2019/130594
§ 371 (c)(1),
(2) Date: Aug. 13, 2021

(87) PCT Pub. No.: WO2020/164327
PCT Pub. Date: Aug. 20, 2020

(65) Prior Publication Data
US 2022/0097572 A1    Mar. 31, 2022

(30) Foreign Application Priority Data

Feb. 14, 2019   (CN) .......................... 201910114760.8

(51) Int. Cl.
*B60N 2/14*       (2006.01)
*B60N 2/02*       (2006.01)

(52) U.S. Cl.
CPC .......... *B60N 2/14* (2013.01); *B60N 2/02246* (2023.08); *B60N 2/02253* (2023.08)

(58) Field of Classification Search
CPC .. B60N 2/14; B60N 2/02246; B60N 2/02253; B60N 2/0244; B60N 2/0224;
(Continued)

(56) References Cited

U.S. PATENT DOCUMENTS 2,648,579 A * 8/1953 Slyter ...................... A47C 3/18
                                                          384/615
3,199,826 A * 8/1965 Miller ...................... A47C 3/18
                                                          297/252
(Continued)

FOREIGN PATENT DOCUMENTS

CN        1268927 A       10/2000
CN      102363414 A        2/2012
(Continued)

OTHER PUBLICATIONS

"International Application No. PCT/CN2019/130594, International Search Report and Written Opinion mailed Mar. 26, 2020", (Mar. 26, 2020), 10 pgs.

*Primary Examiner* — Amy R Weisberg
*Assistant Examiner* — Veronica M Shull
(74) *Attorney, Agent, or Firm* — Schwegman Lundberg & Woessner, P.A.

(57) ABSTRACT

An electric rotation device for an automobile seat disclosed in the present invention includes a rotary support, a rotary disc, a fixed disc, a platen, an upper ball assembly, a lower ball assembly, a driving motor assembly, and a semicircular rack. A center of the semicircular rack coincides with a center of rotation of the rotary support. The semicircular rack is meshed with the driving gear. The driving gear in the driving motor assembly is configured to drive, by using the semicircular rack, the rotary support to perform reciprocating rotation in a range of 0-180°. A special-shaped tooth configured to prevent the driving gear from rotating out of the semicircular rack is disposed at each of extreme positions on two ends of teeth in the semicircular rack, so that the driving gear is gradually snapped with the special-shaped teeth to stop further rotation when rotating to the extreme positions on the two ends of the semicircular rack. The present invention has advantages such as an increased (Continued)

strength, reduced costs, and elimination of a gap between extreme positions. In addition, a wire harness of a seat is prevented from being broken as a result of unlimited rotation.

13 Claims, 5 Drawing Sheets

(58) Field of Classification Search
CPC ............... B60N 2/0232; B60N 2/1635; B60N 2002/022; B60N 2002/0216; B60N 2002/0212
USPC .......... 296/65.18, 65.05; 297/344.22, 344.24
See application file for complete search history.

(56) References Cited

U.S. PATENT DOCUMENTS

| | | | |
|---|---|---|---|
| 4,846,529 A * | 7/1989 | Tulley | B60N 2/02246 297/DIG. 10 |
| 5,482,354 A * | 1/1996 | Gryp | A47C 3/18 297/344.22 |
| 5,762,398 A * | 6/1998 | Gonzalez | B60N 2/14 5/81.1 RP |
| 5,810,441 A * | 9/1998 | Ezuka | B60N 2/143 297/344.22 |
| 6,021,989 A * | 2/2000 | Morita | B60N 2/146 297/344.26 |
| 6,543,848 B1 | 4/2003 | Suga et al. | |
| 8,220,856 B2 * | 7/2012 | Horiguchi | B60N 2/0224 296/65.01 |
| 9,085,245 B2 * | 7/2015 | Haller | B60N 2/509 |
| 9,663,001 B2 * | 5/2017 | Haller | B60N 2/146 |

FOREIGN PATENT DOCUMENTS

| | | | | |
|---|---|---|---|---|
| CN | 205292658 U | | 6/2016 | |
| CN | 205632178 U | | 10/2016 | |
| CN | 103661017 B | | 4/2017 | |
| CN | 206067762 U | | 4/2017 | |
| CN | 108556691 A | * | 9/2018 | ........ B60N 2/0232 |
| CN | 109823239 A | | 5/2019 | |
| CN | 108556691 B | | 9/2020 | |
| JP | 2009274708 A | | 11/2009 | |
| WO | WO-2020164327 A1 | | 8/2020 | |

* cited by examiner

ELECTRIC ROTATION DEVICE FOR AUTOMOBILE SEAT

PRIORITY CLAIM TO RELATED APPLICATIONS

This application is a U.S. national stage filing under 35 U.S.C. § 371 from International Application No. PCT/CN2019/130594, filed on 31 Dec. 2019, and published as WO2020/164327 on 20 Aug. 2020, which claims the benefit under 35 U.S.C. 119 to Chinese Application No. 201910114760.8, filed on 14 Feb. 2019, the benefit of priority of each of which is claimed herein, and which applications and publication are hereby incorporated herein by reference in their entirety.

TECHNICAL FIELD

The present invention relates to the technical field of automobile seats, and in particular, to an electric rotation device for an automobile seat.

BACKGROUND

Existing rotation mechanisms for an automobile seat to rotate about a vertical axis are classified into rolling rotation mechanisms and sliding rotation mechanisms according to a rotation medium. In the rolling rotation mechanism, a plurality of hard balls are pre-disposed in a holder as the rotation medium to cause a movable disc to rotate in an annular track formed by upper and lower row of balls. Currently, there are some rolling rotation mechanisms such as technical solutions disclosed in Chinese patents CN103661017B, CN205292658U, CN205632178U, and CN206067762U. However, the technical solutions have the following problems:
1. complex structures and a large quantity of parts;
2. large space occupation as a result of multistage transmission;
3. failure to be applicable to different seat frames as a result being non-modular;
4. failure to be produced in mass as a result of heavy machined parts; and
5. a low release force.

Inventors of this application made an improvement for the prior art, and submitted a patent application No. CN108556691A related to an electric rotation mechanism for a seat to the China National Intellectual Property Administration, PRC filed on Mar. 29, 2018. The electric rotation mechanism for a seat includes a rotary support, a rotary disc, a fixed disc, a platen, an upper ball assembly, a lower ball assembly, a driving motor assembly mounted to the fixed disc and including a driving gear, and a semicircular rack mounted to the rotary support. A center of circle of the semicircular rack coincides with a center of rotation of the rotary support, and the semicircular rack is meshed with the driving gear. The driving gear in the driving motor assembly drives, by using the semicircular rack, the rotary support to perform reciprocating rotation in a range of 0-180°. The electric rotation mechanism for a seat can realize the reciprocating rotation of the seat between 0-180° merely by means of single-stage transmission of the driving motor assembly, the driving gear, and the semicircular rack, and have transmission mechanisms occupying a small space.

A semicircular arcuate groove is provided on the rotary support of the electric rotation mechanism for a seat. A center of circle of the semicircular arcuate groove coincides with the center of rotation of the rotary support, and the semicircular arcuate groove is located outside the semicircular rack. A central angle of the semicircular arcuate groove is 180°. In addition, a fixing block is mounted to the fixed disc. An upper end of the fixing block extents into the semicircular arcuate groove. In this way, a rotation angle of the rotary support is controlled in a range of 0-180° by means of the engagement between the fixing block and the semicircular arcuate groove, thereby avoiding breakage of a wire harness of the seat as a result of unlimited rotation.

However, providing the semicircular arcuate groove on the rotary support increases processing costs and reduces strength of the rotary support. In addition, mounting the fixing block to the fixed disc also increases a weight and costs.

SUMMARY

A technical problem to be resolved in the present invention is to provide an improved electric rotation device for an automobile seat in view of the technical problems existing in the electric rotation mechanism for an automobile seat disclosed in CN108556691A.

The technical problem to be solved by the present invention may be implemented by the foregoing technical solutions.

An electric rotation device for an automobile seat includes:
 a rotary support;
 a rotary disc, located under the rotary support and fixedly connected to the rotary support and a seat cushion frame in a seat;
 a fixed disc, located under the rotary disc and connected to an upper slide rail in a slide rail assembly of the seat;
 a platen, located above the rotary disc and under the rotary support and fixedly connected to the fixed disc;
 an upper ball assembly, located between the platen and the rotary disc, an upper ball in the upper ball assembly being configured for rolling contact with the platen and the rotary disc;
 a lower ball assembly, located between the rotary disc and the fixed disc, a lower ball in the lower ball assembly being configured for rolling contact with the rotary disc and the fixed disc; and
 a driving motor assembly, mounted to the fixed disc and including:
 a driving gear; and
 a semicircular rack, mounted to the rotary support, a center of circle of the semicircular rack coinciding with a center of rotation of the rotary support, the semicircular rack being meshed with the driving gear, and the driving gear in the driving motor assembly being configured to drive, by using the semicircular rack, the rotary support to perform reciprocating rotation in a range of 0-180°, where A special-shaped tooth configured to prevent the driving gear from rotating out of the semicircular rack is disposed at each of extreme positions on two ends of teeth in the semicircular rack, so that the driving gear is gradually snapped with the special-shaped teeth to stop further rotation when rotating to the extreme positions on the two ends of the semicircular rack.

In an exemplary embodiment of the present invention, the two ends of the semicircular rack are fixed to the rotary support by using rivets.

In an exemplary embodiment of the present invention, the semicircular rack is connected to the rotary support by using three welding lines.

In an exemplary embodiment of the present invention, the driving motor assembly further includes a driving motor, a reduction gearbox, and a driving motor fixing support, the driving motor fixing support is welded to the fixed disc, the driving motor and the reduction gearbox are mounted to the driving motor fixing support, an output shaft in the reduction gearbox extends upward through the driving motor fixing support and extends toward the rotary support, the driving gear is disposed on the output shaft of the reduction gearbox by using splines, and the driving motor is configured to drive, by using the reduction gearbox, the output shaft of the reduction gearbox to rotate.

In an exemplary embodiment of the present invention, a boss connected to the driving motor fixing support is disposed on the driving motor, a tapping screw hole is provided in the boss, a waist-shaped through hole is provided on the driving motor fixing support. The waist-shaped through hole is aligned to the tapping screw hole, and a tapping screw passes through the waist-shaped through hole to be screwed into the corresponding tapping screw hole, so as to mount the driving motor to the driving motor fixing support by using the boss. The arrangement of the waist-shaped through hole on the driving motor fixing support facilitates adjustment of a position of the driving motor.

In an exemplary embodiment of the present invention, the output shaft of the reduction gearbox is composed of a spline shaft and a smooth shaft from bottom to top, the spline shaft on the output shaft of the reduction gearbox is meshed with a spline hole in an output gear in the reduction gearbox, an output shaft passing hole is provided on the driving motor fixing support, the smooth shaft on the output shaft of the reduction gearbox is axially disposed in the output shaft passing hole by using a bushing and a shaft sleeve, the shaft sleeve is fixed to the driving motor fixing support, and the driving gear is disposed on a topmost end of the output shaft of the reduction gearbox by using splines.

In an exemplary embodiment of the present invention, a bottommost end of the output shaft of the reduction gearbox extends out of the reduction gearbox and is fixed by using a shaft sleeve having a stair, and the shaft sleeve having a stair is configured to axially limit the output shaft of the reduction gearbox, so as to prevent the output shaft of the reduction gearbox from being pulled out of the reduction gearbox.

Since the foregoing technical solutions are used, compared with the prior art, the electric rotation device for an automobile seat in the present invention has the following advantages:

By disposing the special-shaped tooth at each of the extreme positions of the teeth in the semicircular rack to prevent the driving gear from rotating out of the semicircular rack, the seat can perform reciprocating rotation in a range of 0-180°. The present invention has advantages such as an increased strength, reduced costs, and elimination of a gap between extreme positions. In addition, a wire harness of a seat is prevented from being broken as a result of unlimited rotation.

DETAILED DESCRIPTION

Figure 1:
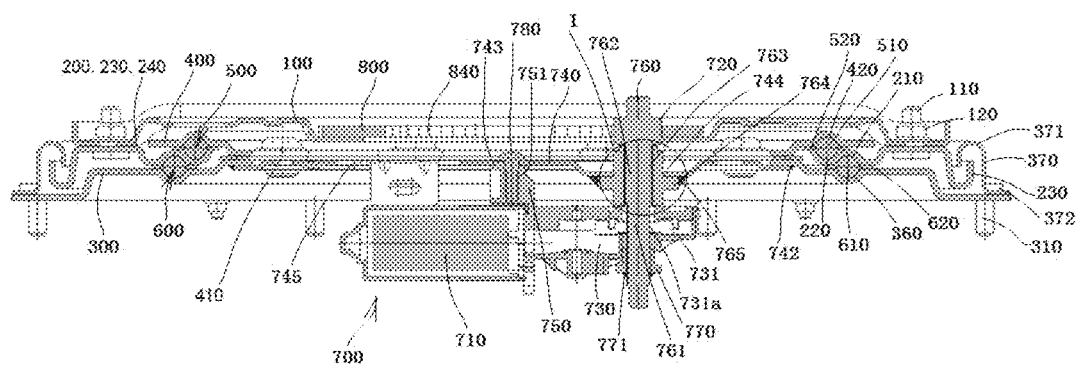
FIG. 1 is a schematic structural diagram of an electric rotation device for an automobile seat according to Embodiment 1 of the present invention.
Figure 2:
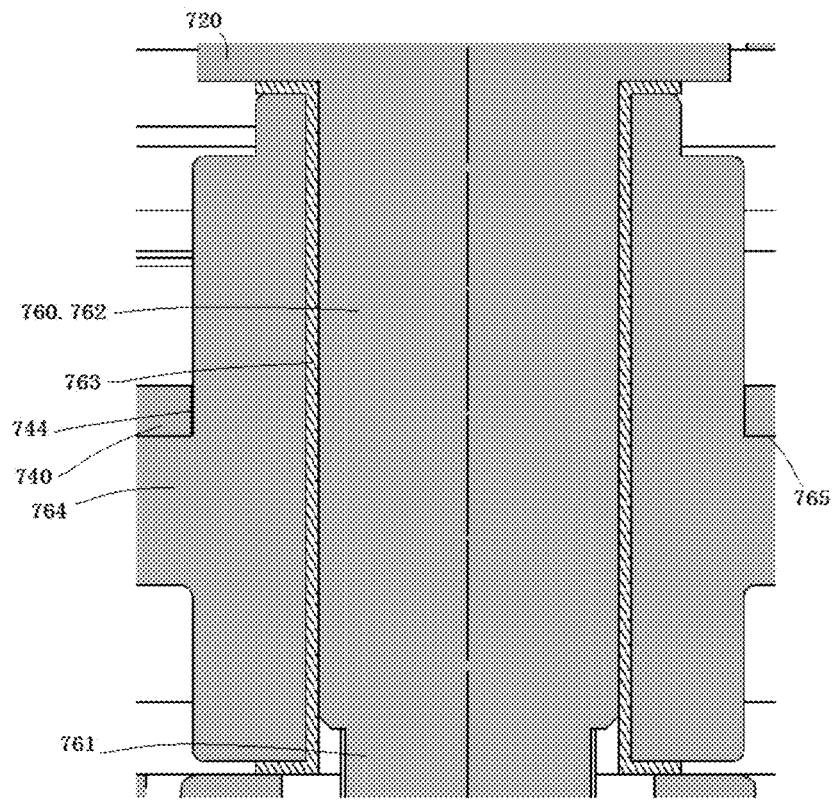
FIG. 2 is a schematic diagram of an enlarged of part I in FIG. 1.
Figure 3:
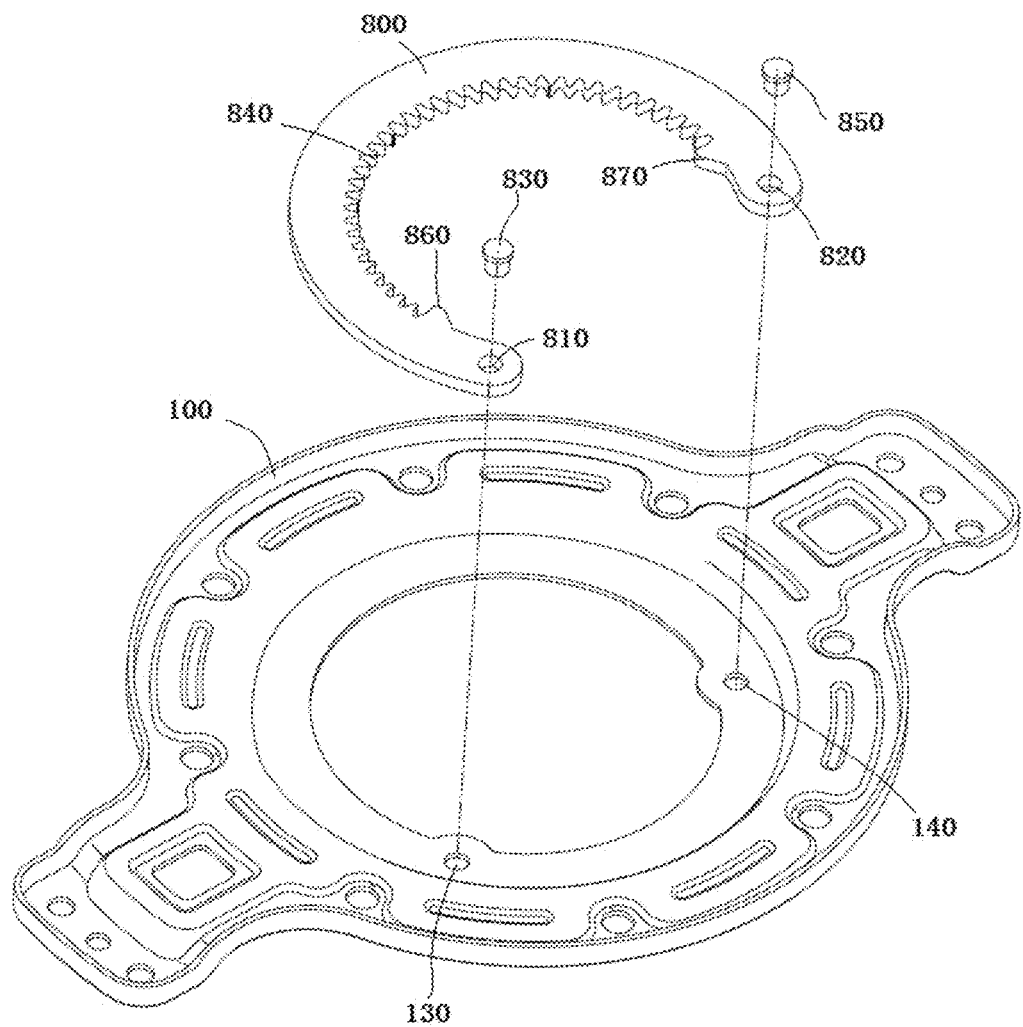
FIG. 3 is a schematic assembly diagram of a semicircular rack and a rotary support in the electric rotation device for an automobile seat according to Embodiment 1 of the present invention.
Figure 4:
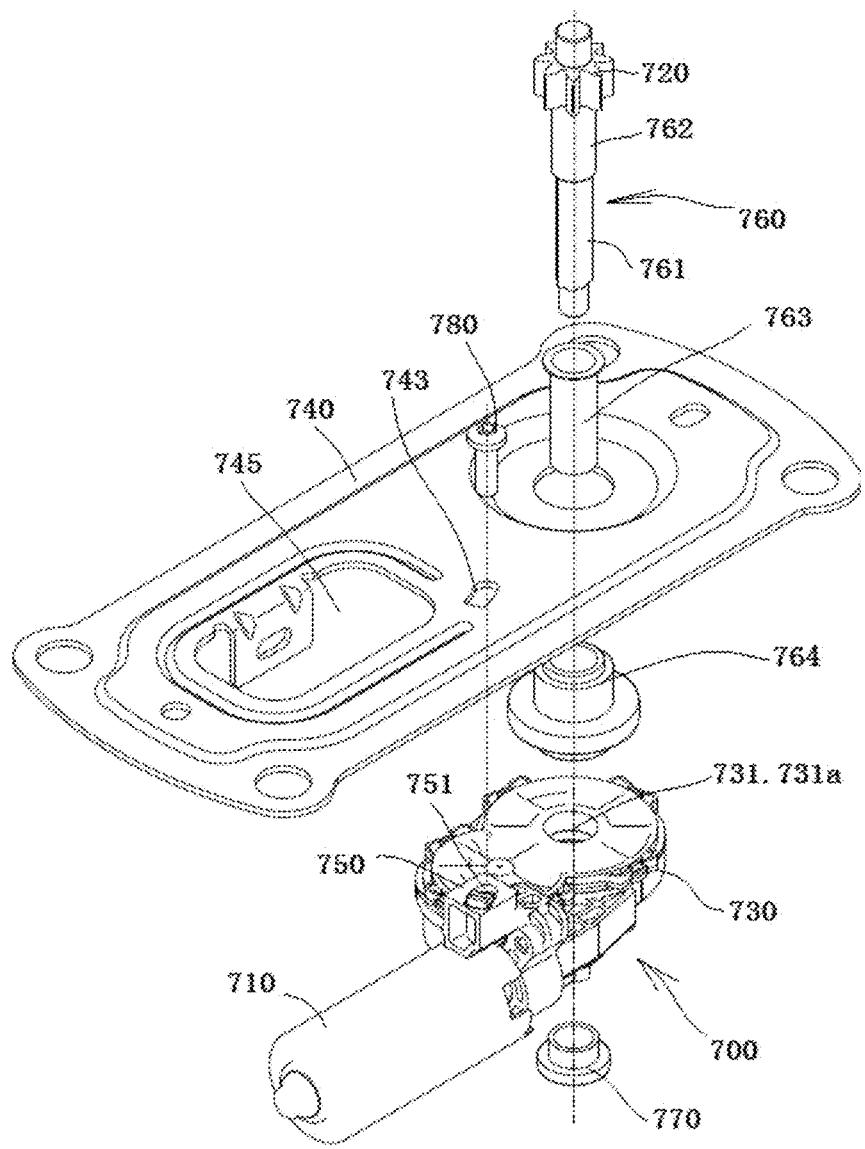
FIG. 4 is a schematic exploded view of a driving motor assembly in the electric rotation device for an automobile seat according to Embodiment 1 of the present invention.
Figure 5:
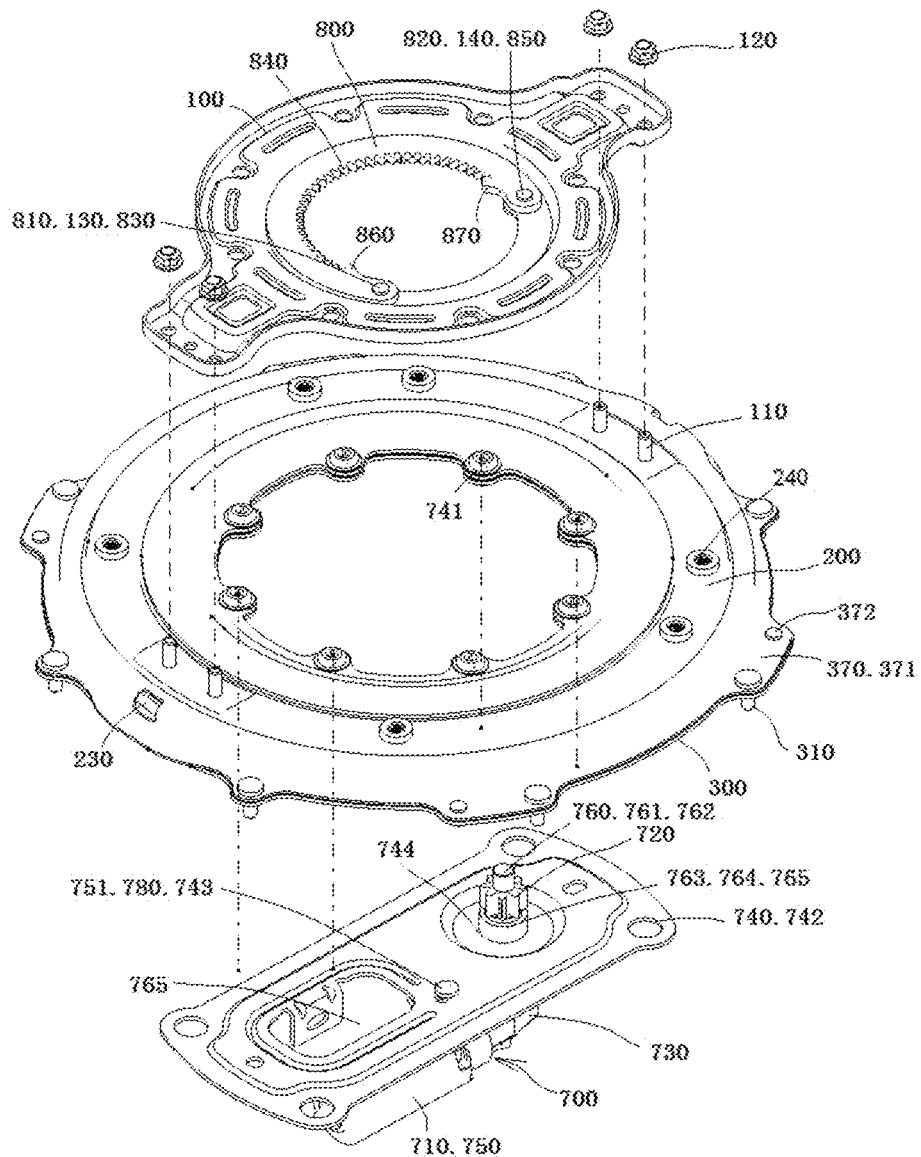
FIG. 5 is a schematic assembly diagram of the rotary support, a fixed disc, and the driving motor assembly in the electric rotation device for an automobile seat according to Embodiment 1 of the present invention.

The following further describes the present invention with reference to the accompanying drawings and specific implementations.

Embodiment 1

As shown in FIG. 1 to FIG. 5, an electric rotation device for an automobile seat includes a rotary support 100, a rotary disc 200, a fixed disc 300, a platen 400, an upper ball assembly 500, a lower ball assembly 600, a driving motor assembly 700, and a semicircular rack 800.

The rotary support 100, the rotary disc 200, the fixed disc 300, the platen 400, the semicircular rack 800, an upper ball holder 510 in the upper ball assembly 500, and a lower ball holder 610 in the lower ball assembly 600 are all stamping parts, which have high strength and light weights.

Six M10 nuts 240 are disposed on the rotary disc 200 by means of spot welding. A seat cushion frame (not shown in figures) in a seat is fixedly connected to the rotary disc 200 by using six bolts (not shown in figures) screwed into the six M10 nuts.

Eight M8 bolts 310 are disposed on the fixed disc 300 by means of spot welding. The fixed disc 300 is fixed to a base (not shown in figures) by using nuts (not shown in figures) screwed into the eight M8 bolts 310. The base is mounted to an upper slide rail (not shown in figures) in a slide rail assembly (not shown in figures) of the seat by using four M12 bolts (not shown in figures).

The rotary support 100 is located above the rotary disc 200 and is fixed to the rotary disc 200 by using four bolts 110 and four nuts 120, so that the rotary support and the rotary disc synchronously rotate.

A central angle of the semicircular rack 800 is 180°. Positioning holes 810 and 820 are respectively provided on two ends of the semicircular rack 800. Two positioning holes 130 and 140 are provided on the rotary support 100 at positions corresponding to the two positioning holes 810 and 820 on the semicircular rack 800. A rivet 830 passes through the positioning holes 810 and 130 and is anchored, and another rivet 850 passes through the positioning holes 820 and 140 and is anchored. In this way, the semicircular rack 800 can be positioned on and mounted to the rotary support 100, and a center of circle of the semicircular rack 800 coincides with a center of rotation of the rotary support 100. After the semicircular rack 800 is positioned on and mounted to the rotary support 100, a periphery of the semicircular rack 800 is welded to the rotary support 100 by using three welding lines (not shown in figures).

Special-shaped teeth 860 and 870 configured to prevent the driving gear 720 from rotating out of the semicircular rack 800 are respectively disposed at extreme positions on two ends of teeth 840 in the semicircular rack 800, so that the driving gear 720 is gradually snapped with the special-shaped teeth 860 and 870 to stop further rotation when rotating to the extreme positions on the two ends of the teeth 840 in the semicircular rack 800. In this way, a gap between the extreme positions can be economically eliminated to realize tightness.

The driving motor assembly 700 includes a driving motor 710, a reduction gearbox 730, and a driving gear 720. The driving motor 710 and the driving gear 720 are fixed to a bottom face of a driving motor fixing support 740. The driving motor fixing support 740 is fixed to the fixed disc 300 by using four bolts 741 and are welded to the fixed disc 300 by using four welding lines 742.

A boss 750 connected to the driving motor fixing support 740 is disposed on the driving motor 710. A tapping screw hole 751 is provided in the boss 750. A waist-shaped through hole 743 is provided on the driving motor fixing support 740. The waist-shaped through hole 743 is aligned to the tapping screw hole 751. A tapping screw 780 passes through the waist-shaped through hole 743 to be screwed into the corresponding tapping screw hole 751, so as to mount the driving motor 710 to the driving motor fixing support 740 by using the boss 750. The arrangement of the waist-shaped through hole 743 on the driving motor fixing support 740 facilitates adjustment of a position of the driving motor 710.

The driving motor 710 drives, by using the reduction gearbox 730, an output shaft 760 in the reduction gearbox 730 to rotate. The output shaft 760 extends upward through the driving motor fixing support 740 and the through hole 744 and extends toward the rotary support 100.

The output shaft 760 is composed of a spline shaft 761 and a smooth shaft 762 from bottom to top. The spline shaft 761 on the output shaft 760 is meshed with a spline hole 731a in an output gear 731 in the reduction gearbox 730. The smooth shaft 762 on the output shaft 760 of is axially disposed in an output shaft passing hole 744 by using a bushing 763 and a shaft sleeve 764. The shaft sleeve 764 is fixed to the driving motor fixing support 740 by using a welding line 765. The driving gear 720 is disposed on a topmost end of the output shaft 760 of the reduction gearbox 730 by using splines, and is meshed with the teeth 840 in the semicircular rack 800.

A bottommost end of the output shaft 760 of the reduction gearbox 730 extends out of the reduction gearbox 730 and is fixed by using a shaft sleeve 770 having a stair. The shaft sleeve 770 having a stair is configured to axially limit the output shaft 760 of the reduction gearbox 730, so as to prevent the output shaft 760 of the reduction gearbox 730 from being pulled out of the reduction gearbox 730. The shaft sleeve 770 having a stair is connected to the reduction gearbox 730 by using a welding line 771. Certainly, the output shaft 760 may also be prevented from being pulled out by using an elastic collar or in other manners.

A wire harness hole 745 is provided on the driving motor fixing support 740. A wire harness of the seat passes through the wire harness hole 745.

The teeth 840 in the semicircular rack 800 are meshed with the driving gear 720. In this way, the driving motor 710 drives the driving gear 720 to rotate, the driving gear 720 drives, by using the semicircular rack 800, the rotary support 100 to perform reciprocating rotation in a range of 0-180°, and the rotary support 100 drives the rotary disc 200 to perform reciprocating rotation in a range of 0-180°.

The platen 400 in the electric rotation device for a seat in the present invention is located above the rotary disc 200 and under the rotary support 100, and is fixedly connected to the fixed disc 300 by using a platen bolt 410.

The upper ball assembly 500 is located between the platen 400 and the rotary disc 200, and the lower ball assembly 600 is located between the rotary disc 200 and the fixed disc 300.

An upper raceway 420 is disposed on the platen 400; an upper-intermediate raceway 210 and a lower-intermediate raceway 220 are disposed on the rotary disc 200, and a lower raceway 360 is disposed on the fixed disc 300. The upper raceway 420 on the platen 400 and the upper-intermediate raceway 210 on the rotary disc 200 face each other in a vertical direction, and the lower-intermediate raceway 220 on the rotary disc 200 and the lower raceway 360 on the fixed disc 300 face each other in a vertical direction.

An upper ball 510 in the upper ball assembly 500 is located between the upper raceway 420 on the platen 400 and the upper-intermediate raceway 210 on the rotary disc 200. An upper surface of the upper ball 510 in the upper ball assembly 500 comes into point contact with the upper raceway 420 on the platen 400, and a lower surface of the upper ball 510 in the upper ball assembly 500 comes into point contact with the upper-intermediate raceway 210 on the rotary disc 200. The upper ball 510 in the upper ball assembly 500 is held by using an upper ball holder 520.

A lower ball 610 in the lower ball assembly 600 is located between the lower-intermediate raceway 220 on the rotary disc 200 and the lower raceway 360 on the fixed disc 300. An upper surface of the lower ball 610 in the lower ball assembly 600 comes into point contact with the lower-intermediate raceway 220 on the rotary disc 200, and a lower surface of the lower ball 610 in the lower ball assembly 600 comes into point contact with the lower raceway 360 on the fixed disc 300. The lower ball 610 in the lower ball assembly 600 is held by using a lower ball holder 620.

Since the fixed disc 300 is fixed, the lower ball 610 in the lower ball assembly 600 is held by using the lower ball holder 620, so that the lower ball 610 can only roll in the lower raceway 360 pre-disposed on the fixed disc 300, and the lower surface of the lower ball 610 in the lower ball assembly 600 comes into point contact with the lower raceway 360 on the fixed disc 300. The lower-intermediate raceway 220 is disposed on the rotary disc 200 and is in point contact with the upper surface of the lower ball 610 in the lower ball assembly 600. In this way, the rotary disc 200 is allowed to be rotated irrespective of disengagement in a Z direction.

In order to avoid disengagement of the rotary disc 200 in the Z-direction, the upper-intermediate raceway 210 is further disposed on the rotary disc 200, the lower surface of the upper ball 510 in the upper ball assembly 500 comes into point contact with the upper-intermediate raceway 210 on the rotary disc 200, and the upper ball 510 in the upper ball assembly 500 is held by using the upper ball holder 520, so that the upper ball 510 can only roll in the upper-intermediate raceway 210 on the rotary disc 200. In addition, in order to avoid disengagement of the rotary disc 200 in the Z-direction, the platen 400 is further disposed, and the upper raceway 420 configured for point contact with the upper surface of the upper ball 510 in the upper ball assembly 500 is disposed on the platen 400, so that the upper ball 510 can only roll in the raceway that is pre-disposed. The platen 400 is fixed to the fixed disc 300, so that the rotary disc 200 can be rotated without disengagement.

In order to increase a release force of the mechanism, a U-shaped mousing hook 230 is disposed at a periphery of the rotary disc 200, and an annular mousing hook 370 is mounted to a position on the fixed disc 300 that is close to the periphery by using a bolt 372. A J-shaped hook 371 on the annular mousing hook 370 and the U-shaped mousing hook 230 are seized with each other. The J-shaped hook 371 on the annular mousing hook 370 and the U-shaped mousing hook 230 form a circumferentially seized inverted structure, so that the release force of the mechanism can be up to more than 30000 N.

Embodiment 2

Figure 6:
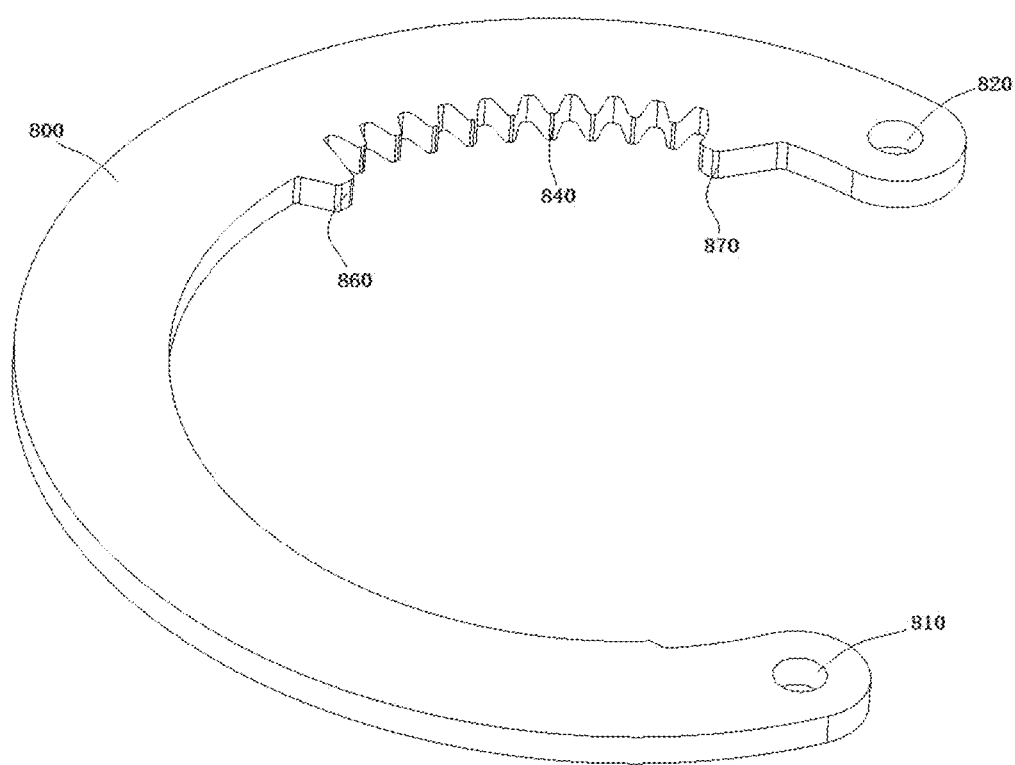
FIG. 6 is a schematic structural diagram of a semicircular rack in an electric rotation device for an automobile seat according to Embodiment 2 of the present invention.

Assuming that a rotation by an angle from 0° to 45° is required, referring to FIG. 6, only central angles of the teeth 840 in the semicircular rack 800 need to be adjusted to 0° to 45°.

The remaining part of an electric rotation device for an automobile seat in this embodiment is the same as that in the electric rotation device for an automobile sea in Embodiment 1.

What is claimed is:

1. An electric rotation device for an automobile seat, the device comprising:
   a rotary support;
   a rotary disc, located under the rotary support and fixedly connected to the rotary support and a seat cushion frame in a seat;
   a fixed disc, located under the rotary disc and connected to an upper slide rail in a slide rail assembly of the seat;
   a platen, located above the rotary disc and under the rotary support and fixedly connected to the fixed disc;
   an upper ball assembly, located between the platen and the rotary disc, an upper ball in the upper ball assembly being configured for rolling contact with the platen and the rotary disc;
   a lower ball assembly, located between the rotary disc and the fixed disc, a lower ball in the lower ball assembly being configured for rolling contact with the rotary disc and the fixed disc; and
   a driving motor assembly, mounted to the fixed disc and comprising:
   a driving gear; and
   a semicircular rack, mounted to the rotary support, a center of circle of the semicircular rack coinciding with a center of rotation of the rotary support, the semicircular rack being meshed with the driving gear, and the driving gear in the driving motor assembly being configured to drive, by using the semicircular rack, the rotary support to perform reciprocating rotation in a range of 0-180°, wherein a special-shaped tooth configured to prevent the driving gear from rotating out of the semicircular rack are respectively disposed at each of extreme positions on two ends of teeth in the semicircular rack, so that the driving gear is gradually snapped with the special-shaped teeth to stop further rotation when rotating to the extreme positions on the two ends of the semicircular rack.

2. The electric rotation device for an automobile seat according to claim 1, wherein the two ends of the semicircular rack are fixed to the rotary support by using rivets.

3. The electric rotation device for an automobile seat according to claim 2, wherein the semicircular rack is connected to the rotary support by using three welding lines.

4. The electric rotation device for an automobile seat according to claim 1, wherein the driving motor assembly further comprises a driving motor, a reduction gearbox, and a driving motor fixing support, the driving motor fixing support is welded to the fixed disc, the driving motor and the reduction gearbox are mounted to the driving motor fixing support, an output shaft in the reduction gearbox extends upward through the driving motor fixing support and extends toward the rotary support, the driving gear is disposed on the output shaft of the reduction gearbox by using splines, and the driving motor is configured to drive, by using the reduction gearbox, the output shaft of the reduction gearbox to rotate.

5. The electric rotation device for an automobile seat according to claim 4, wherein a boss connected to the driving motor fixing support is disposed on the driving motor, a tapping screw hole is provided in the boss, a waist-shaped through hole is provided on the driving motor fixing support, the waist-shaped through hole is aligned to the tapping screw hole, and a tapping screw passes through the waist-shaped through hole to be screwed into the corresponding tapping screw hole, so as to mount the driving motor to the driving motor fixing support by using the boss, wherein the arrangement of the waist-shaped through hole on the driving motor fixing support facilitates adjustment of a position of the driving motor.

6. The electric rotation device for an automobile seat according to claim 4, wherein the output shaft of the reduction gearbox is composed of a spline shaft and a smooth shaft from bottom to top, the spline shaft on the output shaft of the reduction gearbox is meshed with a spline hole in an output gear in the reduction gearbox, an output shaft passing hole is provided on the driving motor fixing support, the smooth shaft on the output shaft of the reduction gearbox is axially disposed in the output shaft passing hole by using a bushing and a shaft sleeve, the shaft sleeve is fixed to the driving motor fixing support, and the driving gear is disposed on a topmost end of the output shaft of the reduction gearbox by using splines.

7. The electric rotation device for an automobile seat according to claim 6, wherein a bottommost end of the output shaft of the reduction gearbox extends out of the reduction gearbox and is fixed by using a shaft sleeve having a stair, and the shaft sleeve having a stair is configured to axially limit the output shaft of the reduction gearbox, so as to prevent the output shaft of the reduction gearbox from being pulled out of the reduction gearbox.

8. An electric rotation device for an automobile seat, the device comprising:
   a rotary support;
   a rotary disc, located under the rotary support and fixedly connected to the rotary support and a seat cushion frame in a seat;
   a fixed disc, located under the rotary disc and connected to an upper slide rail in a slide rail assembly of the seat;
   a platen, located above the rotary disc and under the rotary support and fixedly connected to the fixed disc;
   an upper ball assembly, located between the platen and the rotary disc, an upper ball in the upper ball assembly being configured for rolling contact with the platen and the rotary disc;
   a lower ball assembly, located between the rotary disc and the fixed disc, a lower ball in the lower ball assembly being configured for rolling contact with the rotary disc and the fixed disc; and
   a driving motor assembly, mounted to the fixed disc and comprising:
   a driving gear; and
   a semicircular rack, mounted to the rotary support, a center of circle of the semicircular rack coinciding with a center of rotation of the rotary support, the semicircular rack being meshed with the driving gear, and the driving gear in the driving motor assembly being configured to drive, by using the semicircular rack, the rotary support to perform reciprocating rotation in a range of 0-180°, wherein a special-shaped tooth configured to prevent the driving gear from rotating out of the semicircular rack are respectively disposed at each of extreme positions on two ends of teeth in the semicircular rack, so that the driving gear is gradually snapped with the special-shaped teeth to stop further rotation when rotating to the extreme positions on the two ends of the semicircular rack;

wherein the driving motor assembly further comprises a driving motor, a reduction gearbox, and a driving motor fixing support, the driving motor fixing support is welded to the fixed disc, the driving motor and the reduction gearbox are mounted to the driving motor fixing support, an output shaft in the reduction gearbox extends upward through the driving motor fixing support and extends toward the rotary support, the driving gear is disposed on the output shaft of the reduction gearbox by using splines, and the driving motor is configured to drive, by using the reduction gearbox, the output shaft of the reduction gearbox to rotate.

9. The electric rotation device for an automobile seat according to claim 8, wherein the two ends of the semicircular rack are fixed to the rotary support by using rivets.

10. The electric rotation device for an automobile seat according to claim 9, wherein the semicircular rack is connected to the rotary support by using three welding lines.

11. The electric rotation device for an automobile seat according to claim 8, wherein a boss connected to the driving motor fixing support is disposed on the driving motor, a tapping screw hole is provided in the boss, a waist-shaped through hole is provided on the driving motor fixing support, the waist-shaped through hole is aligned to the tapping screw hole, and a tapping screw passes through the waist-shaped through hole to be screwed into the corresponding tapping screw hole, so as to mount the driving motor to the driving motor fixing support by using the boss, wherein the arrangement of the waist-shaped through hole on the driving motor fixing support facilitates adjustment of a position of the driving motor.

12. The electric rotation device for an automobile seat according to claim 8, wherein the output shaft of the reduction gearbox is composed of a spline shaft and a smooth shaft from bottom to top, the spline shaft on the output shaft of the reduction gearbox is meshed with a spline hole in an output gear in the reduction gearbox, an output shaft passing hole is provided on the driving motor fixing support, the smooth shaft on the output shaft of the reduction gearbox is axially disposed in the output shaft passing hole by using a bushing and a shaft sleeve, the shaft sleeve is fixed to the driving motor fixing support, and the driving gear is disposed on a topmost end of the output shaft of the reduction gearbox by using splines.

13. The electric rotation device for an automobile seat according to claim 12, wherein a bottommost end of the output shaft of the reduction gearbox extends out of the reduction gearbox and is fixed by using a shaft sleeve having a stair, and the shaft sleeve having a stair is configured to axially limit the output shaft of the reduction gearbox, so as to prevent the output shaft of the reduction gearbox from being pulled out of the reduction gearbox.

\* \* \* \* \*